April 6, 1965 S. McCULLOUGH 3,177,379
RELAY FOR ELECTRICAL POSITIONING DEVICES
Original Filed April 16, 1959 2 Sheets-Sheet 2
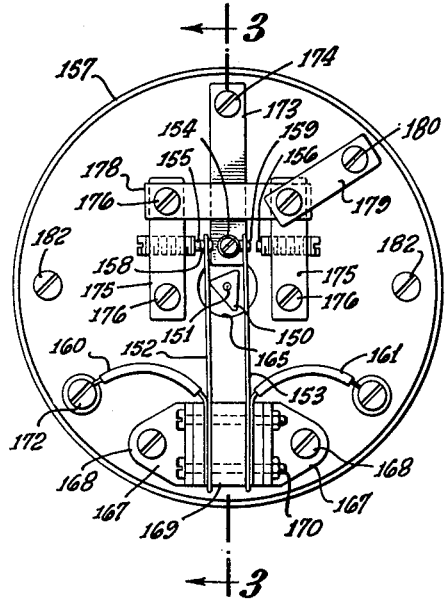
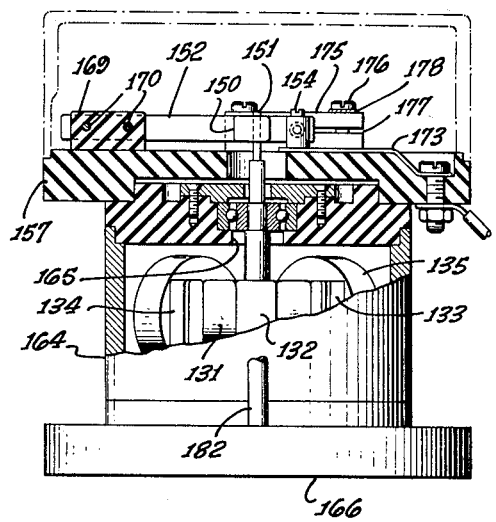
INVENTOR.
STUART McCULLOUGH United States Patent Office 3,177,379
Patented Apr. 6, 1965

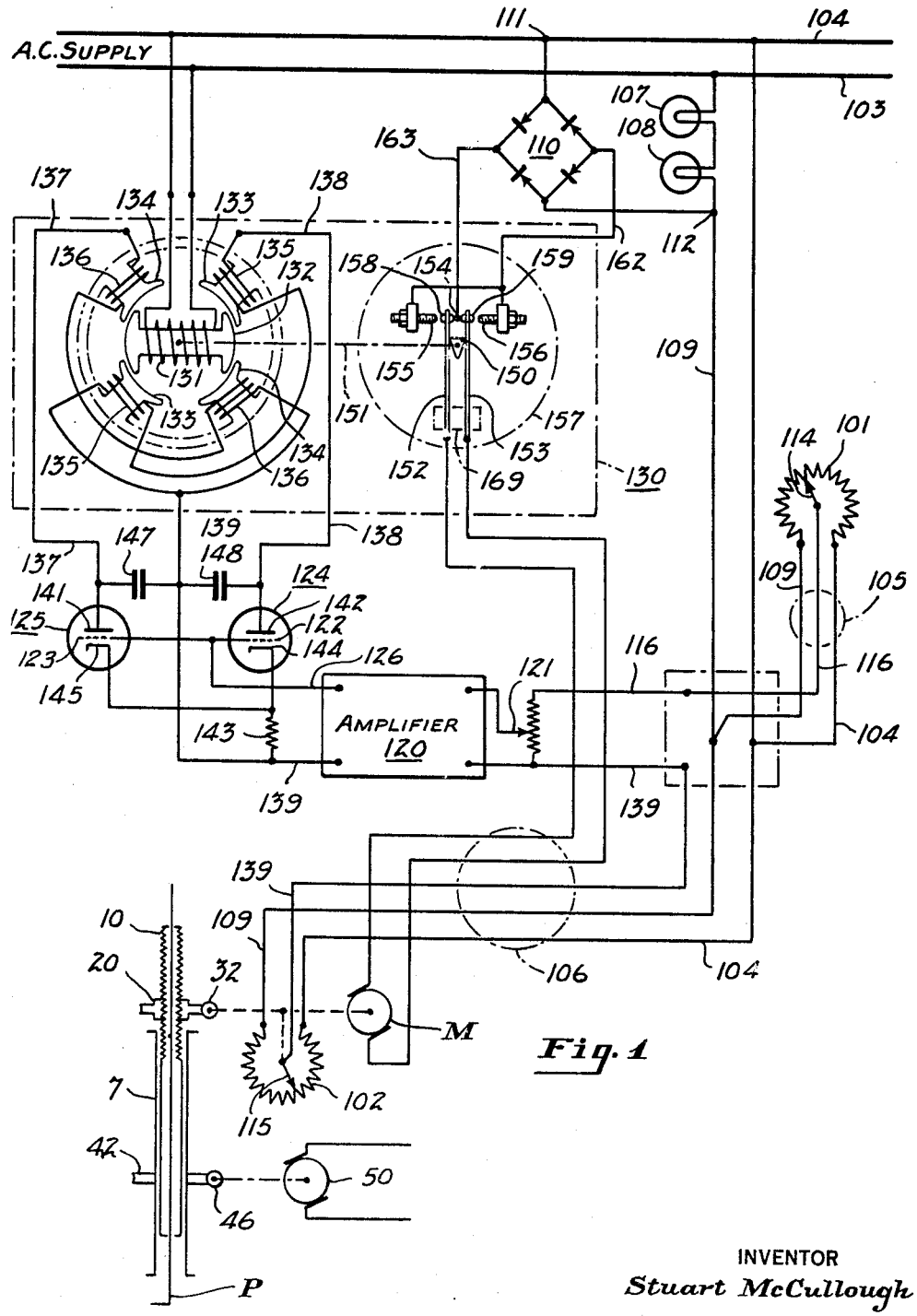

3,177,379
RELAY FOR ELECTRICAL POSITIONING
DEVICES
Stuart McCullough, 18098 Karen Drive, Encino, Calif.
Original application Apr. 16, 1959, Ser. No. 806,970, now Patent No. 3,039,031. Divided and this application Aug. 23, 1961, Ser. No. 138,215
9 Claims. (Cl. 307—127)

This application is a division of my prior application Serial No. 806,970, filed April 16, 1959, Now U.S. Patent 3,039,031, which is a continuation-in-part of my prior application, Serial No. 360,724, filed June 10, 1953, now abandoned.

This invention relates to automatic control systems and components thereof for use in electrically controlled positioning mechanisms and devices of similar character. The invention in particularly concerned with the energization and control of electric motors used in positioning servos, and is particularly applicable to on-off type control of such motors. The broad objective of the invention is to provide a motor control relay operable by a simple amplifier and adapted for use in positioning servo systems of relatively simple construction.

Such a relay should be able to connect the electric motor to a source of power such that it may be caused to run in either direction as desired, to disconnect it to permit it to coast, or to connect it for dynamic braking. These switching functions should operate in proper sequence in response to a signal from the sensory element. The servo relay which is described herein is adapted to control a shunt motor in response to a suitable signal and to provide as a function of said signal, forward energization, reverse energization, coasting, and dynamic braking. By combining these switching functions in a single device with multiple positions, proper switching sequence is assured without the use of interlock circuits.

For maximum ease of utilization an electrical control system should readily accept signals from any of the various common primary error sensing elements which produce as an output an A.C. signal increasing in magnitude with increasing error and reversing in phase with reversal of the direction of the error. To accomplish this a phase sensitive device is required. The subject relay is inherently phase sensitive and may accordingly be controlled in response to the output of such sensing elements by the use of a suitable amplifier.

If a control system using the relay described is used to follow a continuously changing balance point, the motor may be permitted to run continuously with moderate speed variations. This is made possible by the relay which can brake the motor, permit it to coast, or energize it. The availability of a coast position permits the motor to decelerate gently. Dynamic braking eliminates the need to apply reverse energization to the motor in order to stop it quickly. Thus high accelerations of the motor may be avoided when so operating.

Other objects and advantages of the invention pertain to the general improvement and simplification of control systems of the character mentioned, and to certain novel constructions, combinations, and interactions of parts and components set forth in the following description of the invention. This description is made with reference to the accompanying drawings, which form part of the specification.

Referring to the drawings:

FIGURE 1 is a diagram of the present invention as applied to a probe actuating device.

FIG. 2 is an orthographic view of the top of the servo relay of FIGURE 1 showing the contact structure;

FIG. 3 is a sectional detail, with parts removed and cut away, through the top of the servo relay, this view being taken substantially along line 3—3 of FIG. 2.

The subject invention can best be explained with refference to the simplified diagram of FIG. 1. In this diagram it is understood that a motor M of the actuator is connected by suitable means such as gearing, to a load the position of which is to be controlled. The load by way of example is a probe P that may be projected or retracted by motor rotation in a corresponding direction. The connection between the motor M and the probe P is shown diagrammatically by a dotted line representing a mechanical linkage connecting motor M to a worm 32, which in turn engages worm gear teeth on the periphery of a nut 20. The nut engages threads of a carrier tube 10 for the probe. Rotation of the nut causes extension and retraction of the carrier tube which is restrained from moving angularly. The probe may also be angularly positioned by turning a sleeve 7 keyed to the tube, the motor M and associated gearing being supported on the sleeve 7 so that this movement of the sleeve does not affect the longitudinal adjustment. A motor 50 turning worm 46 by means of suitable gearing effects rotation of a worm gear 42 which is attached to sleeve 7. This function is independent of the described invention but may be effected by a control such as will be described for extension and retraction. Since the invention may be used with a variety of actuator structures further details are omitted as unnecessary.

The primary or error sensing element here consists of a resistance bridge comprising potentiometers 101 and 102. The potentiometer 102 has a slider 115 the position of which follows that of the probe P whereby an electrical indication of the position of the probe P is obtained. For this purpose, a linkage is also provided between the motor M and the slider 115, as indicated in dotted lines. This structure is supported with the motor M. The input or master potentiometer 101 may be located in any convenient place, and its slider 114 positioned manually or by some other device. The potentiometer connections may be conveniently included in cables 105 and 106, the bridge being connected to its source of excitation by leads 104 and 109. A.C. power is supplied as indicated by leads 103 and 104. Bridge excitation current flows through lamps 107 and 108, which act as a suitable non-linear resistance.

The output of the potentiometer bridge appears across sliders 114 and 115, which are connected by leads 116 and 139 to a suitable voltage amplifier 120 of conventional design. Manual adjustment of gain may be made by potentiometer 121 inserted in the circuit. The bridge output is an A.C. signal that represents the difference in position of sliders 114 and 115. The direction in which slider 115 must be moved to restore balance is indicated by the phase of this signal, which inverts when the direction of the error reverses.

D.C. power for the motor is obtained by connecting full wave rectifier 110 at 111 and 112, such that the current drawn from the supply passes through lamps 107 and 108. The voltage applied to the rectifier for energizing the motor is thus the same as the voltage used to excite the potentiometer bridge.

Connection of the motor M to the source of power in response to the error signal is accomplished by the servo relay indicated diagrammatically by the box 130 in FIG. 1 and shown in greater detail in FIGS. 2 and 3. The relay comprises an electromagnetic structure that produces a torque on shaft 151 as a function of the error signal, a contact assembly that accomplishes the switching in the motor circuit as a result of this torque, and the associated structure. The operation of the relay will first be discussed briefly with reference to FIG. 1 in order to impart a concept of the operation of the control system of which it is a part. Details of its structure and operation will be discussed later.

The magnetic circuit of the relay comprises a laminated iron rotor and stator and an air gap separating them. A flux is established in it by a current in a coil 131 wound on rotor 132, which may be of the magneto type as depicted in FIG. 1 or may have distributed windings to accomplish the same end. This coil is connected by slip rings and brushes or flexible leads (not shown) to leads 103 and 104 of the A.C. supply. The magnetic flux path is completed by the stator. The stator in this instance has four salient poles, 133, 134, 133, and 134, the same reference character being use for diametrically opposite poles because their operation is cumulative. The stator may be made with either concentrated windings on salient poles as shown or with distributed windings in slots.

The magnetic structure may be identical to that of certain types of synchros. The magnetic flux produced by the roter 132 links coil pairs 135 and 136 associated with the pole pairs 133 and 134. A voltage is accordingly induced in the coils. The coil pairs are connected in series as shown so that the induced voltages add and such that if a suitable load or short circuit is connected across the pair of coils for one pole set 135 or 136, the magnetic flux of the rotor will be displaced so that it will, for the most part, pass through the other pole set 136 or 135. This occurs because the currents, which will flow through the coils and a suitable load impedance as a result of the induced voltage, will tend to create a magnetic force opposing the flux that induced the voltage. Loading one pair of coils more than the other will therefore produce a net displacement of the flux path, such that the flux distribution is no longer symmetrical about the axis of rotor 132 nor equally distributed among all 4 stator poles. The displacement of the flux will produce a net torque on rotor 132, in much the same manner as a torque is produced in synchros. This torque may be conveniently regarded as the force resulting from the flux and the current carrying conductors immersed in it, in the case of distributed stator windings, or the torque may be thought of as simply the tendency of the rotor to align itself with the flux path of the stator in the case of salient stator poles. Either physical concept will be adequate to picture the operation of the system.

The ends of the stator coils 135 and 136 are connected by leads 137 and 138 to plates 141 and 142 of vacuum triodes 125 and 124 and to condensers 147 and 148 which provide a path for A.C. currents. The common center terminal of coils 135 and 136 is connected to the condensers and to the output of the voltage amplifier 120 by lead 139, which may be the ground of the circuit. Indirectly heated cathodes 144 and 145 are also connected to lead 139 through bias resistor 143. The grids 122 and 123 of tubes 124 and 125 are connected to the output of the voltage amplifier 120 by lead 126.

Tubes 124 and 125 are thus supplied with plate voltages of opposite phase, such that their plates are alternately positive, that is, able to conduct current. The grids are supplied with the error signal which reverses phase with reversal of direction of the error. The combination is therefore phase sensitive, favoring the conduction of one tube when the phase of the error signal is such that the grids tend to become positive when its plate is positive and during the next half cycle when the plate of the other tube is positive tending to prevent the conduction of this other tube by a negative signal voltage applied to the grids. In this manner tubes 124 and 125 may be regarded as regulating the relative magnitude of current flowing in coils 135 and 136 in response to the error signal, and in doing so affect the flux distribution in the relay so as to produce a torque on the relay shaft 151 corresponding in direction and magnitude to the error signal causing it.

In order to move the contacts of the relay and perform the actual switching operations in the motor circuit, a triangular toggle or lever 150 is attached to shaft 151 of the relay. Springs 152 and 153 mounting contacts 158 and 159 are secured by an insulator assembly 169 to a supporting plate 157. In the zero-error signal condition the springs 152 and 153 cause contacts 158 and 159 to engage contact 154 simultaneously. Contact 154 is connected by lead 163 to an output terminal of rectifier 110, and contacts 158 and 159 are connected to the armature of motor M, which may have a permanent magnet field. In this condition the motor armature is shorted and dynamic braking is effected. If an error signal should cause a sufficient torque to be applied to toggle 150, it will tend to rotate and in doing so displace contact 158 or 159 out of engagement with contact 154. The phase of the error signal will determine the direction of the torque and which contact is displaced. In this condition the motor armature lead connected to the contact so displaced is open circuited, and the motor is permitted to coast. Should the error signal be of greater magnitude, the displaced contact may be forced into engagement with a fixed contact. Contact 158 may be made to engage contact 155 in this manner, or contact 159 may be made to engage contact 156. Contacts 155 and 156 are connected by lead 162 to the other output terminal of rectifier 110, and when engaged by a movable contact energization of the motor is effected. The engagement of contact 158 with contact 155 while contact 159 engages contact 154 will cause motor rotation in one direction; the engagement of contact 159 with contact 156 while contact 158 engages contact 154 will apply power of opposite polarity to the armature of the shunt motor and cause rotation in the opposite direction.

Thus it is seen that the servo relay is capable of connecting the motor for forward and reverse energization, for dynamic braking, or maintaining it disconnected so that it may coast. This switching action occurs as a function of the applied signal such that for a large signal of one phase, energization in one direction is caused; for a lesser signal, coasting is permitted; for a still smaller signal dynamic braking is applied; for a signal of suitable magnitude and opposite phase, coasting is also permitted; and for a large signal of opposite phase energization in the opposite direction is effected.

Referring to FIGS. 1, 2, and 3, the detailed construction of the relay will now be considered. FIG. 2 shows the contact arrangement with contact 158 displaced to engage contact 155. The entire contact assembly is mounted on the supporting plate 157, which is made of insulating material such as a suitable phenolic laminate. Movable contacts 158 and 159 are mounted on flat metal springs 152 and 153, which are in turn secured between insulating spacers 169 and attached to angle brackets 167 by through bolts 170. Screws 168 attach the angle brackets to the plate 157. Leads 160 and 161 connect the springs 152 and 153 to suitable terminals as 172.

Contact 154 may take the form of a sleeve surrounding a screw that passes through a hole in strip 173 and screws into end plate 157, and is connected by strip 173 to terminal 174. Stationary contacts 155 and 156 are mounted on screws to facilitate their adjustment, these screws engaging internal threads in bars 175 which may be made of brass and secured to the end plate 157 by screws 176. The bars 175 may be slotted as at 177 for clamping the screws that mount contacts 155 and 156 for adjustment. A jumper strip 178 connects bars 175, and strip 179 connects them to terminal 180.

A circular rabbet fit between the plate 157 and a circular top end of relay frame 164 is shown in FIG. 3. The plate 157 forms an end plate for the frame 164. End plate 157 and base 166, which is similarly fitted to the other end of frame 164, are held in place by screws 182 which may be loosened to permit rotation of the contact assembly relative to the magnetic structure for purposes of alignment. The parts are arranged and clearances so adjusted that in the quiescent position shown in FIG. 1 contacts 158 and 159 both bear against contact 154, there being a small clearance between toggle 150 and springs 152 and 153, and contacts 155 and 156 are adjusted so as to be disengaged from contacts 158 and 159 while in this condition.

The operation of the combination of output tubes, condensers, and relay magnetic structure may now be discussed in greater detail. Vacuum tubes such as 124 and 125 pass plate current only when the plate is positive. Thus with no signal on the grids, the plate currents are substantially in phase with the applied plate voltages. These plate voltages, being induced in the secondary coils of the relay, however, are nearly 90° out of phase with the flux inducing them. In order to produce a net torque in the relay it is necessary to have a component of current in the secondary coils in phase with the flux linking them. This may be obtained by the manipulation of coil resistance and leakage reactance in design and the use of condensers across the relay coils.

Considering the plate circuit of one output tube with no A.C. signal applied to the grid, the current flowing through the tube and coil in the relay would approximate half of a sine wave due to the half wave rectification occurring. This current would produce negligible net torque because during the first 90 electrical degrees during which current flowed, the current carrying conductors would be immersed in flux of one direction, which flux would then decrease to zero value as the current reached a maximum, and then build up in the opposite direction as the current fell to zero. The resulting torque would change direction as the flux reversed (the current maintaining its original direction) so there would be no net torque in either direction from this current since the torque impulses sequentially produced would be of approximately equal value and of opposite direction.

Certain things may be done to produce a net torque in spite of this. The most obvious is to apply a signal to the grid of the tube shifted in phase so that the conduction of the tube will be enhanced during one-half and reduced during the other half of the half cycle during which the plate of the tube is positive. Another is to so design the relay and circuit that a phase shift occurs within the relay as a secondary coil is loaded. If a major portion of the induced voltage were used to overcome the leakage reactance drop in the secondary coil, for instance, the terminal voltage and coil current could be nearly in phase with the flux.

The circuit action such as may be employed with such a relay as described may occur as follows: The resistance of the primary coil causes the primary current and flux to advance in phase so that the voltage induced in the secondary is somewhat advanced in phase with respect to the line. The secondary current through the condensers is approximately in phase with the flux, leading the induced voltage, such that a condenser current unbalance would produce a net torque. Since the signal voltage is substantially in phase with the line voltage, and therefore lags the plate voltage, a signal favoring conduction of a tube will favor conduction during the later portion of the half cycle of positive plate voltage more than it will during the earlier portion. Thus the application of a signal to a tube in approximate phase with but lagging somewhat behind the plate voltage tends to increase the lagging current and produce a net torque. This current causes the secondary terminal voltage to fall due to resistance and leakage reactance drops, and in doing so the plate voltage lags farther, coming more nearly into phase with signal voltage. The current of the condenser connected in parallel also falls and lags accordingly with the voltage reduction, reducing the torque caused by the associated leading current through the condenser and coil that opposes the torque caused by the current through the tube. There is a much lesser change in phase and magnitude of voltage applied to the condenser in parallel with the other tube, and the current through it, which causes a torque that aids the torque caused by conduction of the tube discussed, substantially continues. Thus an adequate net torque may be produced and the combination kept phase sensitive.

The structure (pole faces, air gap, etc.) is further designed so that the torque is principally a function of the applied signal, and may decrease somewhat as the displacement of the rotor from neutral increases in contrast to conventional relays in which the operating force may increase substantially as iron parts of the magnetic circuit approach one another. The triangular toggle acts as a variable ratio linkage since its effective lever arm changes as it it displaced, and the springs mounting the movable contacts supply a restoring force. The entire combination is so proportioned that there is very little difference between the signal required to cause contact closure to energize the motor and the signal which will permit opening of these contacts. The toggle and contacts may be maintained at rest in any desired position by the application of a coresrponding non-fluctuating signal.

The unconventional nature of the relay described provides certain advantages for servo work. It provides for dynamic braking as well as coasting and forward and reverse energization of the motor. The switching action effecting these connections can occur only in proper sequence. The difference in signal causing make and break of a contact is very small for static observations, thereby avoiding a lag. The relay is inherently phase sensitive with the simplest output stage driving it. Its disadvantages, the weight of the structure required to produce a desired contact pressure, and the rotor inertia required for 60 cycle operation to filter the torque impulses occurring during different parts of the cycle, do not impair its suitability for applications when maximum servo motor acceleration is not needed and weight and torsional vibration are not critical.

The operation of the relay in the described control system may now be considered. Referring to FIG. 1, an error in the position of slider 115 of potentiometer 102 relative to the setting of slider 114 of potentiometer 101 is manifested as an A.C. signal input to the amplifier 120. The magnitude of this signal is indicative of the magnitude of the error, and its phase indicative of the direction of the error. The amplified error signal is applied to grids 122 and 123. The phase relationship of the error signal to the plate voltages of output tubes 124 and 125 will determine which tube will conduct more and which will conduct less, and thus determine whether the current through coils 136 will exceed the current through coils 135 or vice versa. The resulting current unbalance in the stator coils will tend to displace the stator flux from its quiescent path, thereby producing a torque on rotor 132 which is transmitted by shaft 151 to toggle 150. The resulting angular displacement of the toggle operates the contacts to effect motor energization in such direction that it will rotate so as to tend to correct the error causing this energization.

The control circuit causes the motor to be deenergized in anticipation of the arrival at the balance point, in the manner described in greater detail in U.S. Patent 3,039,-031. The inertia of the rotor of the relay is sufficient to prevent an immediate reclosing of contacts, and if the error is being further reduced by the rotation of the motor as it coasts the error signal tending to cause reclosing of the relay is also being diminished. When the error becomes quite small dynamic braking is applied, serving either to stop the motor at the desired balance point, or, if the motor speed is great enough that overshoot will inevitably occur, the period of dynamic braking will effect a considerable speed reduction that will reduce the extent of overshoot.

If the balance point is shifting continuously at a moderate rate it is desirable to have the motor follow smoothly. Under such conditions the relay may oscillate between the coast and energize positions, and the motor will run continually at reduced speed without great accelerations or decelerations. In the event the motor reaches the balance point the dynamic braking serves to slow it down, thereby avoiding the high reverse acceleration associated with reverse energization which would otherwise be caused if a sizable error in the opposite direction were permitted to develop.

The inventor claims:

1. A relay for controlling the energization of a reversible electrical actuator, said relay comprising rotor and stator members mounted for rotation of the rotor relative to the stator, a coil winding on one of the members and means for connecting it to a source of alternating current energy, a pair of coil windings on the other of the members and arranged so that a voltage is induced in each by transformer action when the coil on the one member is energized, said pair of coils having a common lead such that the induced voltages between the common lead and the other leads of the pair of coils are opposite in phase, a set of relatively fixed contacts and a set of relatively movable contacts for connection, one set to a direct current source and the other set to a reversible electrical actuator sensitive to the direction of the electrical current supplied thereto, and means operated by relative rotative movement of the members and having connection with one set of the contacts for effecting relative movement of the contacts, the movement effecting means being arranged to connect the contact sets for the supply of direct current in one direction to the electrical actuator upon relative rotation of the members in one direction and to connect the contact sets for the supply of such current to the actuator in the reverse direction upon rotation of the members in the other direction.

2. A switch relay device for use in electrical servo controls and the like, said device comprising a supporting structure, fixed contacts mounted on the structure in space relation, movable contact means, a pair of arms supporting the movable contact means for movement between the fixed contacts, the contact means carried by one of the arms being movable between one pair of the fixed contacts and the contact means carried by the other of the arms being movable between another pair of the fixed contacts, each arm being resiliently biased normally to hold the movable contact carried thereby engaged against one of the fixed contacts, an actuator movable over an arcuate path and engageable in one direction with one of the arms and in another direction with the other of the arms to shift the engaged arm and the movable contact carried by such arm away from the respective engaged contact and toward and against the other of the fixed contacts associated with such engaged arm, and electromagnetic means for moving the actuator selectively in one direction or the other when energized, the resiliently biased arms each being arranged when engaged and shifted to bear against the actuator with a restoring force to return the movable contact carried by such arm toward and against the one normally engaged fixed contact associated therewith upon deenergization of the electromagnetic means.

3. A switch relay device for use in electrical servo controls and the like, said device comprising a supporting structure, fixed contacts mounted on the structure in spaced relation, a movable contact, an element supporting the movable contact for movement between the fixed contacts, and electromagnetic means for shifting the element to move the movable contact into engagement with one or the other of the fixed contacts, the electromagnetic means including stator and armature members providing a flux path, a coil on one of the members for inducing electromagnetic flux over the path, and coil means on the other of the members, said last mentioned coil means including coils arranged to be loaded unequally in relation to one another whereby to effect variation in the flux travelling said path and to thereby obtain an operative force between the members.

4. In an electromagnetic device for producing a mechanical force, torque, or displacement which is a function of an electrical input signal, a magnetic circuit including a stationary portion and a movable portion separated by an air gap, an excitation winding establishing an alternating flux of substantially constant magnitude in said circuit, signal coil means linked by a portion of said flux whereby a voltage is induced therein and whereby a current therein will tend to cause augmentation or reduction of that portion of said linking flux, said movable portion of said magnetic circuit being arranged to experience a torque or force as a function of the current through said signal coil means and variable load means connected to said signal coil means for varying the current in response to said input signal.

5. A relay comprising a set of fixed and movable contacts and an electromagnetic actuator, a link connecting said actuator and said movable contacts to facilitate positioning of said movable contacts by said actuator in response to input signals to said actuator, said contacts being appropriately connected electrically to 2 terminals designated as first and second line terminals and 2 terminals designated as load terminals, said contacts and connections being arranged to maintain connection of both load terminals to said first line terminal in the absence of a significant input signal to said actuator, to effect selective disconnection of either of said load terminals from said first line terminal in response to suitable input signals, and to effect selective connection of either load terminal to said second line terminal while maintaining connection of the other load terminal to said first line terminal in response to correspondingly greater input signals.

6. A relay comprising a set of fixed and movable contacts, said fixed contacts being connected to 2 terminals used as first and second input terminals and said movable contacts being connected to 2 terminals used as output terminals, a bi-directional electromagnetic actuator, said actuator having a magnetic circuit including a stator and a rotor separated by an air gap, an exciter coil to establish an alternating flux in said magnetic circuit, and signal coils linked by a portion of said flux such that a voltage is induced therein and such that if an external load is connected thereto a current will flow through the signal coil to which the load is connected such that this current results in a displacement of the path of said flux, said rotor being of such form that it experiences a torque as a result of such flux displacement, and a link connecting said rotor to said movable contacts, the whole being arranged such that in the absence of significant load being applied to said signal coils said output terminals are both maintained in electrical connection with the first input terminal; that upon application of appropriate load to one of the signal coils either output terminal may selectively be disconnected from said first input terminal; and that upon application of a greater appropriate load to one of the signal coils either output terminal may be selectively connected to the second input terminal, the other output terminal remaining connected to the first input terminal.

7. A relay as defined in claim 6 having an internal phase shift varying as a function of applied load such as to permit operation of said relay with variable loads such as vacuum tubes having rectifier characteristics.

8. A relay comprising an electromagnetic actuating device capable of selectively producing a force in either of 2 opposite directions, said device having a magnetic circuit including a fixed portion and a movable portion separated by an air gap, an excitation winding together with means for applying A.C. power to said winding whereby to cause an alternating magnetic flux in said magnetic circuit, and 2 control windings each linked by a substantial portion of said flux such that a voltage is induced in each and such that a load connected to one of said control windings would permit a current to flow therein which would react with said magnetic flux to produce a force in one direction on said movable portion of said magnetic circuit whereas a load connected to the other of said control windings would similarly produce a force in the opposite direction.

9. A relay as defined in claim 8 having an internal phase shift of the voltage induced in the control windings with respect to the phase of the excitation voltage, said phase shift varying as a function of current through said control windings so as to facilitate operation of the relay by loads having rectifier characteristics, thereby permitting control of the relay by utilizing vacuum tubes as variable load devices.

References Cited by the Examiner

UNITED STATES PATENTS

| 810,687 | 1/06 | Townsend | 200—91 |
| 911,549 | 2/09 | Townsend | 200—91 |
| 2,106,474 | 1/38 | Baughman | 307—127 |
| 2,252,438 | 8/41 | Petersen et al. | 200—91 |

FOREIGN PATENTS 161,679  5/33  Switzerland.

LLOYD McCOLLUM, *Primary Examiner.*